(12) United States Patent
Katsurahira

(10) Patent No.: US 9,778,761 B2
(45) Date of Patent: Oct. 3, 2017

(54) CAPACITIVE STYLUS PEN

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 14 days.

(21) Appl. No.: 14/402,093

(22) PCT Filed: Dec. 12, 2013

(86) PCT No.: PCT/JP2013/083292
§ 371 (c)(1),
(2) Date: Nov. 18, 2014

(87) PCT Pub. No.: WO2014/097953
PCT Pub. Date: Jun. 26, 2014

(65) Prior Publication Data
US 2015/0130772 A1 May 14, 2015

(30) Foreign Application Priority Data
Dec. 17, 2012 (JP) .................................. 2012-274195

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC ... G06F 3/03545; G06F 3/03546; G06F 3/041
See application file for complete search history.

(56) References Cited

U.S. PATENT DOCUMENTS

| 8,841,735 B2 | 9/2014 | Horie et al. | |
| 2005/0063570 A1* | 3/2005 | Kim | G07C 9/00063 |
| | | | 382/119 |

(Continued)

FOREIGN PATENT DOCUMENTS

| CN | 102087565 A | 6/2011 |
| EP | 1806647 A2 | 7/2007 |

(Continued)

OTHER PUBLICATIONS

International Search Report dated Feb. 10, 2014, for corresponding International Application No. PCT/JP2013/083292, 4 pages.

*Primary Examiner* — Alexander Eisen
*Assistant Examiner* — Cory Almeida
(74) *Attorney, Agent, or Firm* — Seed Intellectual Property Law Group LLP

(57) ABSTRACT

A capacitive stylus pen that inputs an indicated position by capacitive coupling with a tablet is provided. The capacitive stylus pen includes a power supply that is charged in a contactless manner, a coil provided at a position indicating part of the capacitive stylus pen, an electrode that penetrates through the coil and protrudes to form a tip part, and an alternating-current signal generating circuit that supplies an alternating-current signal to the electrode. During contactless charging, the coil is magnetically coupled to an external charge device that has a penholder shape, to thereby charge the power supply, which supplies power to the alternating-current signal generating circuit.

20 Claims, 2 Drawing Sheets

INTERNAL STRUCTURE DIAGRAM OF POSITION INDICATOR

(56) References Cited

U.S. PATENT DOCUMENTS

| | | | | |
|---|---|---|---|---|
| 2005/0162411 A1* | 7/2005 | Berkel van | ......... | G06F 3/03545 345/179 |
| 2009/0065269 A1* | 3/2009 | Katsurahira | ............ | G06F 3/046 345/179 |
| 2010/0207607 A1* | 8/2010 | Katsurahira | ........ | G06F 3/03545 324/207.11 |
| 2012/0306824 A1* | 12/2012 | Horie | .................. | G06F 3/03545 345/179 |
| 2013/0193532 A1 | 8/2013 | Horie et al. | | |

FOREIGN PATENT DOCUMENTS

| | | | |
|---|---|---|---|
| JP | 57189062 U | 11/1982 |
| JP | 03-054035 U | 5/1991 |
| JP | 0354035 U | 5/1991 |
| JP | 03290723 A | 12/1991 |
| JP | 04096212 A | 3/1992 |
| JP | 06250772 A | 9/1994 |
| JP | 7295722 A | 11/1995 |
| JP | 0836452 A | 2/1996 |
| JP | 2003316507 A | 11/2003 |
| JP | 2005-529414 A | 9/2005 |
| JP | 2007164356 A | 6/2007 |
| JP | 2013156066 A | 8/2013 |

* cited by examiner

INTERNAL STRUCTURE DIAGRAM OF POSITION INDICATOR

CIRCUIT CONFIGURATION OF EMBODIMENT EXAMPLE

RELATIONSHIP BETWEEN WRITING PRESSURE AND SIGNAL FREQUENCY

CAPACITIVE STYLUS PEN

FIELD OF THE INVENTION

The present invention relates to a capacitive stylus pen that serves as a position indicator, which can be used to indicate a position on a tablet based on a capacitive coupling system. The capacitive stylus pen includes a transmission circuit that transmits information regarding the position indicator, such as writing pressure information.

BACKGROUND

Patent Document 1 (Japanese Patent Laid-open No. 2007-164356) co-assigned to the applicant, discloses a position indicator of an electromagnetic induction system. The position indicator of the electromagnetic induction system includes, at its position indicating part, a coil for indicating a coordinate position by electromagnetic induction with a tablet. The position indicator also includes an electric double layer capacitor that is used as a power supply. Patent Document 1 describes contactless charging by electromagnetic induction between the coil and a charger shaped in the form of a penholder. According to Patent Document 1, high-speed charging is performed when a user places the position indicator in the penholder, and thus the position indicator has superb operability which does not require the user to consciously perform charging operation.

In the case of the position indicator of the electromagnetic induction system of the type described above, a coordinate position is obtained by electromagnetic induction with the tablet. In general it is difficult to use the tablet sensor of the electromagnetic induction type also as a capacitive touch panel.

Patent Document 1 further discloses an example of a capacitive position indicator that can be used with a touch panel. Additional capacitive position indicators using a capacitive system are disclosed in Patent Document 2 (Japanese Patent Laid-open No. Hei 07-295722), Patent Document 3 (Japanese Patent Laid-open No. Hei 06-250772), etc.

Prior Art Documents

Patent Document 1: Japanese Patent Laid-open No. 2007-164356
Patent Document 2: Japanese Patent Laid-open No. Hei 07-295722
Patent Document 3: Japanese Patent Laid-open No. Hei 06-250772

SUMMARY

Technical Problem

In the example of the capacitive position indicator described in Patent Document 1, an electric double layer capacitor is used as a power supply, but a contact point that connects to an external power supply needs to be provided to charge the double layer capacitor. This renders charging operation of the position indicator cumbersome and, also, a contact failure may occur.

Furthermore, in the capacitive position indicator of Patent Document 1, an electrode for position detection, a shield electrode, a writing pressure sensor, and so forth are all positioned at the position indicating part of the position indicator, which is near the tip part of the position indicator and which is brought into contact with or close to the tablet. Therefore, there is no sufficient space for providing a coil for the purpose of contactless charging.

The present invention suggests a solution to the above-described problems by providing a capacitive stylus pen, which can be contactlessly charged by a charger in the shape of a penholder and thus has improved operability.

Technical Solution

In the invention of claim 1, a capacitive stylus pen is provided that inputs an indicated position by capacitive coupling with a tablet. The capacitive stylus pen includes a power supply that is charged in a contactless manner, a coil that is located at a position indicating part, an electrode that penetrates through the coil for electrical connection and is so disposed as to protrude to a tip part, and an alternating-current signal generating circuit that supplies an alternating-current signal to the electrode. The coil is magnetically coupled to an external charge device to charge the power supply at a time of charge operation.

The invention of claim 2 is characterized in that a writing pressure detecting sensor is provided in the capacitive stylus pen, and the electrode or a line connecting to the electrode is provided in a core body that transmits a pressure applied at the tip part of the capacitive stylus pen to the writing pressure detecting sensor.

The invention of claim 3 is characterized in that an engaging part between the writing pressure detecting sensor and the core body serves as a contact point for supplying the alternating-current signal to the electrode.

It is preferable that the coil is wound around a hollow magnetic core as in the invention of claim 4.

The invention of claim 5 is characterized in that the coil is set at a fixed potential to be used as a shield electrode at a time of normal operation, as opposed to the time of charge operation described above.

Advantageous Effect

According to this invention, a capacitive stylus pen is provided, which can be contactlessly charged by a charger in the shape of a penholder and thus has improved operability.

BRIEF DESCRIPTION OF DRAWINGS

FIG. 4 is a diagram for explaining other embodiments of a capacitive stylus pen according to the present invention.

DETAILED DESCRIPTION

Figure 1:
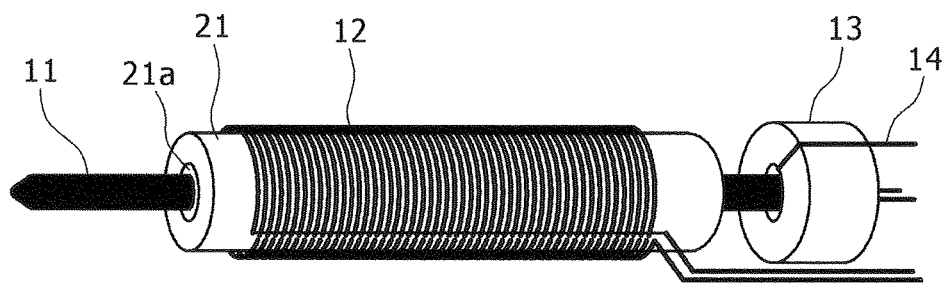
FIG. 1 is an internal structure diagram of a position indicating part of a capacitive stylus pen according to an embodiment of the present invention.
Figure 2:
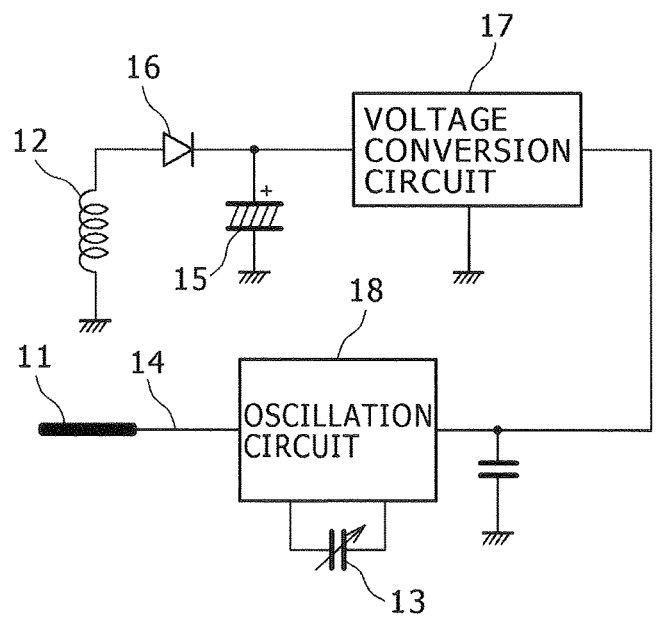
FIG. 2 is a circuit configuration diagram of the capacitive stylus pen of the embodiment of FIG. 1.

FIG. 1 is a diagram showing an internal structure of a position indicating part of a capacitive stylus pen according to an embodiment of the present invention. FIG. 2 is a circuit configuration diagram of an embodiment example. In FIGS. 1 and 2, the same constituent element is shown by the same symbol. Numeral 11 denotes an electrode core. Numeral 12 denotes a coil wound around a ferrite core 21, wherein the ferrite core 21 is as an example of a magnetic core in which a penetration hole 21a is opened along the axial direction. Numeral 13 denotes a variable-capacitance capacitor whose capacitance changes depending on writing pressure. The diameter of the penetration hole 21a made in the ferrite core 21 is sufficiently larger than the outer diameter of the electrode core 11. In this embodiment, the electrode core 11 is a bar-shaped conductor and is obtained by integrally forming an electrode and a core body that presses the variable-capacitance capacitor 13.

The variable-capacitance capacitor 13 is one example of a writing pressure detecting sensor and can be formed, for example, by a variable-capacitance capacitor as described in Japanese Patent Laid-open No. Hei 4-96212. Specifically, the variable-capacitance capacitor 13 may be composed of two electrodes opposed to each other, and a dielectric provided between the two electrodes. The contact area between one of the two electrodes and the dielectric is changed depending on the applied pressure. It should be noted, however, that the variable-capacitance capacitor 13 is not limited to such a variable-capacitance capacitor. For example, the variable-capacitance capacitor 13 may be a capacitive pressure sensing semiconductor device, where capacitance changes depending on the applied pressure, as described in Japanese Patent Application No. 2012-15254.

In FIG. 2, numeral 15 denotes an electric double layer capacitor and numeral 16 denotes a diode for rectification. Numeral 17 denotes a voltage conversion circuit and numeral 18 denotes an oscillation circuit as an alternating-current signal generating circuit. As shown in FIG. 2, in this example, one end of the coil 12 is connected to the anode of the diode 16 and the other end is grounded (GND). Furthermore, one terminal of the electric double layer capacitor 15 is connected to the cathode of the diode 16 and the other end is grounded.

The electrode core 11 penetrates through the penetration hole 21a of the ferrite core 21, around which the coil 12 is wound, and is physically coupled (engaged) with the variable-capacitance capacitor 13. In addition, the electrode core 11 is electrically connected to a connection line 14 where the electrode core 11 and the variable-capacitance capacitor 13 are coupled. The connection line 14 electrically connects the electrode core 11 to the oscillation circuit 18. Therefore, a pressure (writing pressure) applied to the electrode core 11 is transmitted to the variable-capacitance capacitor 13 due to the physical coupling between the electrode core 11 and the variable-capacitance capacitor 13, and a transmission signal from the oscillation circuit 18 is transmitted to the electrode core 11 via the connection line 14.

The oscillation circuit 18 generates a signal whose frequency changes depending on the capacitance of the variable-capacitance capacitor 13, and supplies the generated signal to the electrode core 11. The signal from the oscillation circuit 18 is radiated from the electrode core 11 as an electric field based on the signal. In one embodiment, the oscillation circuit 18 is formed by an LC oscillation circuit that utilizes resonance by a coil and a capacitor.

Figure 3:
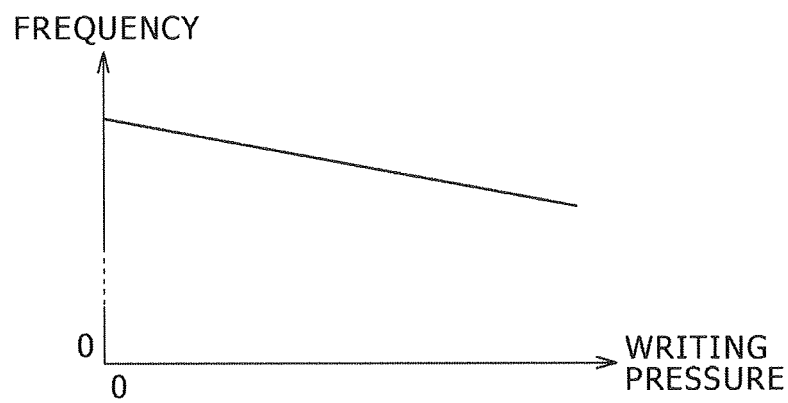
FIG. 3 is a diagram used for explaining the operation of the capacitive stylus pen of the embodiment of FIG. 1.
Figure 3:
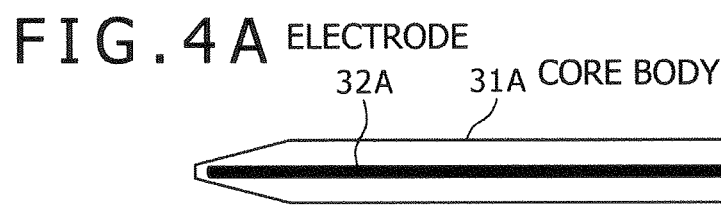
Figure 3:
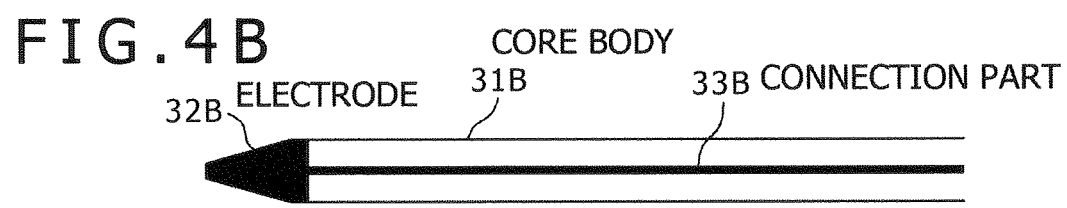
Figure 3:
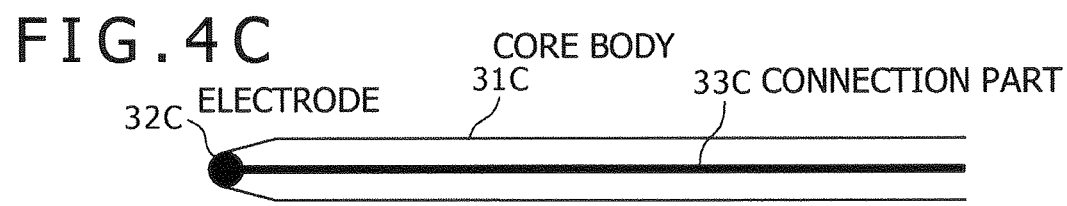

FIG. 3 is a diagram showing the relationship between a pressure applied to the variable-capacitance capacitor 13 and a frequency of a signal from the oscillation circuit 18. In a tablet that detects the coordinate position of the capacitive stylus pen of this embodiment, a writing pressure applied to the electrode core 11 can be obtained from a frequency of a signal from the oscillation circuit 18.

The voltage conversion circuit 17 converts a voltage accumulated in the electric double layer capacitor 15 to a threshold voltage and supplies the converted voltage as a power supply to the oscillation circuit 18. In one embodiment, the voltage conversion circuit 17 is a buck-type circuit, where an output voltage is lower than a voltage across the electric double layer capacitor 15. In another embodiment, the voltage conversion circuit 17 is a boost-type circuit, where an output voltage is higher than a voltage across the electric double layer capacitor 15. In a further embodiment, the voltage conversion circuit 17 is a circuit of a boost-buck type that operates as a buck circuit when a voltage across the electric double layer capacitor 15 is higher than the threshold voltage, and operates as a boost circuit when a voltage across the electric double layer capacitor 15 is lower than the threshold voltage.

When the capacitive stylus pen of this embodiment is mounted on a charger (not shown; see Patent Document 1), an induced electromotive force is generated in the coil 12 by an alternating magnetic field generated by the charger such that the electric double layer capacitor 15 is charged via the diode 16.

When the capacitive stylus pen of this embodiment is carrying out a normal operation (when a charge operation is not being carried out), the coil 12 is at a fixed potential, such as a ground potential (GND), and, therefore, acts as a shield electrode provided around the electrode core 11. It should be noted that the fixed potential of the coil 12, when the capacitive stylus pen is carrying out the normal operation, is not limited to a ground potential. For example, the fixed potential of the coil 12 may be a positive-side potential of the power supply, or may be an intermediate potential between the positive-side potential of the power supply and the ground potential.

Effects of Embodiment

According to the capacitive stylus pen of the above-described embodiment, because the electrode core 11 is so disposed as to penetrate through the charge coil 12 to protrude the tip part thereof, the writing pressure applied to the electrode core 11 is transmitted to the variable-capacitance capacitor 13 without being inhibited.

Furthermore, according to the capacitive stylus pen of the above-described embodiment, because the electrode core 11 is so disposed as to penetrate through the charge coil 12, a cross-sectional area of the charge coil 12 can be large. Therefore, charging operation can be performed efficiently at high speed.

In addition, according to the capacitive stylus pen of the above-described embodiment, because the electrode core 11 is so disposed as to penetrate through the charge coil 12, the charge coil 12 and the electrode core 11 can be disposed in a compact space and the capacitive stylus pen can be made with a small diameter.

Moreover, according to the capacitive stylus pen of the above-described embodiment, because the charge coil 12 acts as a shield electrode at a time of normal operation (when a charge operation is not being carried out), even when the position indicating part of the capacitive stylus pen is held by a user's hand the signal output from the electrode core 11 is not affected.

Furthermore, according to the capacitive stylus pen of the above-described embodiment, because the charge coil 12 is provided around the electrode core 11, contactless charging becomes possible by a charger provided in the shape of a penholder, thus improving operability of the capacitive stylus pen.

Other Embodiments or Modification Examples

In the above-described embodiment, a frequency of a signal generated by the oscillation circuit 18 is changed by changing the capacitance of the variable-capacitance capacitor 13 depending on the writing pressure. However, the frequency of the signal may be changed by changing the inductance of an LC oscillation circuit based on a stroke change of the electrode core 11 depending on the writing pressure.

As the circuit to perform charging operation in the above-described embodiment, a half-wave rectification circuit based on the coil 12 and the diode 16 is used. However, a full-wave rectification circuit made by providing an intermediate terminal to the coil 12 and connecting it to the GND may be used, or a bridge rectification circuit may be used.

In the above-described embodiment, the electrode core 11 has a form of a bar-shaped conductor made by monolithically forming an electrode and a core body. However, the electrode core 11 may have a form obtained by forming an electrode and a core body separately and coupling them together. FIGS. 4(A) to (C) show various examples of an electrode coupled to a core body that transmits a pressure (writing pressure) to a writing pressure detecting sensor, such as a variable-capacitance capacitor.

In a first example shown in FIG. 4(A), a core body 31A is formed of a bar-shaped body made of an insulating material, such as resin, has a circular or polygonal column shape, and has an end part, in the axial core direction, that is formed into a tapered shape to be employed as a pen tip of a stylus pen. Furthermore, an electrode 32A, formed of a conductor with a thin bar shape, is disposed at the center axis position of the core body 31A. In the case of this first example, the electrode 32A is also exposed at a coupling part (engaging part) between the core body 31A and the variable-capacitance capacitor 13, which is an example of a writing pressure detecting sensor, and is electrically connected to the connection line 14 directly. That is, the coupling part between the variable-capacitance capacitor 13, as a writing pressure detecting sensor, and the core body 31A serves as a contact point for supplying an alternating-current signal to the electrode 32A.

In a second example shown in FIG. 4(B), a core body 31B is formed of a bar-shaped body made of an insulating material, such as resin, and has a circular or polygonal column shape. An electrode 32B, which is formed of a conductor with a substantially triangular pyramid shape, is coupled to an end part of the core body 31B in the axial core direction by an adhesive or the like. Furthermore, a connection part (connecting part) 33B, formed of a line-shaped or bar-shaped conductor, is included at a center axis position of the core body 31B, and is electrically connected to the electrode 32B. In the case of this second example, the electrode 32B is electrically connected to the connection line 14 via the connection part 33B.

In a third example shown in FIG. 4(C), a core body 31C is formed of a bar-shaped body made of an insulating material, such as resin, and has a circular or polygonal column shape. A spherical electrode 32C is buried at an end part of the core body 31C in the axial core direction. Furthermore, a connection part (connecting part) 33C formed of a line-shaped or bar-shaped conductor is included at the center axis position of the core body 31C, and is electrically connected to the electrode 32C. In the case of this third example, the electrode 32C is electrically connected to the connection line 14 via the connection part 33C.

In the above-described embodiments, a writing pressure detected by a writing pressure detecting sensor is converted to a frequency to be supplied to an electrode. However, a signal attribute associated with the writing pressure is not limited to frequency. For example, the writing pressure may be associated with a phase of a signal, or a number of times of connection/disconnection of a signal.

In the above-described embodiments, an alternating-current signal generating circuit sends out an alternating-current signal according to a writing pressure detected by a writing pressure detecting sensor via an electrode. However, the alternating-current signal generated from the alternating-current signal generating circuit is not limited to the signal according to the writing pressure. For example, a tilt detected by a tilt detecting sensor that detects the tilt of a stylus pen relative to an indication input surface may be supplied to the electrode as the alternating-current signal.

DESCRIPTION OF REFERENCE SYMBOLS

11 Electrode core,
12 Coil,
13 Variable-capacitance capacitor,
14 Connection line,
15 Electric double layer capacitor,
16 Diode,
17 Voltage conversion circuit,
18 Oscillation circuit,
21 Ferrite core.

The invention claimed is:

1. A capacitive stylus pen, comprising:
a power supply;
a coil configured to charge the power supply in a contactless manner during a charge operation, the coil being positioned at a position indicating part of the capacitive stylus pen and magnetically coupled to an external charge device;
an electrode extending through the coil and having an end that protrudes to form a tip of the capacitive stylus pen; and
an alternating-current signal generating circuit configured to supply an alternating-current signal to the electrode, the signal being output from the electrode,
wherein, when the charge operation is not being performed, the coil is set at a fixed potential and shields the electrode, and
wherein, when the capacitive stylus pen is held by a user's hand, the signal output from the electrode is independent of a potential of the user's hand.

2. The capacitive stylus pen of claim 1, further comprising:
a writing pressure detecting sensor; and
a core body configured to transmit pressure applied at a tip portion of the core body to the writing pressure detecting sensor, the core body including the electrode or a line connecting to the electrode.

3. The capacitive stylus pen of claim 2, wherein a portion where the writing pressure detecting sensor engages with the core body serves as a contact point for the supply of the alternating-current signal to the electrode.

4. The capacitive stylus pen of claim 1, wherein the coil is wound around a hollow magnetic core.

5. The capacitive stylus pen of claim 1, wherein the fixed potential is a ground potential.

6. A capacitive position indicator, comprising:
an electrode core having a first end and a second end;
a charge coil, the electrode core extending through the charge coil, the first end of the electrode core being exposed;
a signal generator configured to generate a signal and supply the signal to the electrode core, which emits a position indicating signal from the first end; and
a power supply configured to be charged in a contactless manner via the charge coil during a charge operation when the charge coil is magnetically coupled to an external charge device, the power supply providing power to the signal generator, wherein, when the charge operation is not being performed, the charge coil is set at a fixed potential and shields the electrode core, and wherein, when the capacitive position indicator is held by a user's hand, the signal emitted from the electrode core is independent of a potential of the user's hand.

7. The capacitive position indicator of claim 6, further comprising:

a detection sensor configured to detect pressure, the detection sensor being physically coupled to the second end of the electrode core, a detected pressure being encoded in the signal generated by the signal generator.

8. The capacitive position indicator of claim 7, wherein the detection sensor includes a variable capacitor.

9. The capacitive position indicator of claim 7, wherein the detection sensor detects pressure based on a physical pressure applied to the first end of the electrode core.

10. The capacitive position indicator of claim 7, wherein a frequency of the signal generated by the signal generator is set based on the detected pressure.

11. The capacitive position indicator of claim 6, further comprising a detection sensor configured to detect a tilt of the capacitive position indicator relative to a sensor surface, a detected tilt being encoded in the signal generated by the signal generator.

12. The capacitive position indicator of claim 6, wherein the power supply is an electric double layer capacitor.

13. The capacitive position indicator of claim 6, wherein the fixed potential is a ground potential.

14. The capacitive position indicator of claim 6, wherein the charge coil is electrode core is wound around a hollow ferrite core.

15. The capacitive position indicator of claim 6, wherein the first end of the electrode core has a cone shape.

16. The capacitive position indicator of claim 6, wherein the first end of the electrode core has a spherical shape.

17. A method, comprising:

contactlessly charging a power supply of a capacitive position indicator during a charge operation by magnetically coupling a charge coil, which is coupled to the power supply, with an external charge device;

powering, by the power supply, a signal generator of the capacitive position indicator;

supplying a signal generated by the signal generator to an electrode core extending through the charge coil;

emitting a position indicating signal from an end of the electrode core protruding from the charge coil; and shielding the electrode core by setting the charge coil at a fixed potential, when the charge operation is not being performed, wherein, when the capacitive position indicator is held by a user's hand, the position indicating signal emitted from the electrode core is independent of a potential of the user's hand.

18. The method of claim 17, further comprising:

detecting a pressure applied to the capacitive position indicator; and encoding a detected pressure in the signal generated by the signal generator.

19. The method of claim 18, wherein the encoding of a detected pressure in the signal generated by the signal generator includes setting a frequency of the signal generated by the signal generator based on the detected pressure.

20. The method of claim 17, further comprising:

detecting a tilt of the capacitive position indicator relative to a sensor surface; and encoding a detected tilt in the signal generated by the signal generator.

* * * * *